No. 878,733. PATENTED FEB. 11, 1908.
L. E. LACHAT.
TRUCK OR TROLLEY WITH SLIDING STEERING WHEELS.
APPLICATION FILED MAY 13, 1905.

WITNESSES
W. P. Burke
John A. Percival

INVENTOR
Leon Ernest Lachat
BY
Richardson
ATT'YS.

UNITED STATES PATENT OFFICE.

LÉON ERNEST LACHAT, OF LYON, FRANCE.

TRUCK OR TROLLEY WITH SLIDING STEERING-WHEELS.

No. 878,733.     Specification of Letters Patent.     Patented Feb. 11, 1908.

Application filed May 13, 1905. Serial No. 260,331.

*To all whom it may concern:*

Be it known that I, LÉON ERNEST LACHAT, civil engineer, citizen of France, residing at 25 Quai Claude Bernard, Lyon, France, have invented new and useful Improvements in Trucks or Trolleys with Sliding Steering-Wheels, of which the following is a specification.

This invention relates to improvements in the construction of trucks operated by any mode of traction, but more especially to those manipulated by hand, and having the steering wheels slidably mounted on the axles thereof.
The said improvements comprise devices for returning the said slidable steering wheels to their mid-position on their respective axles, consisting of springs arranged outside the axles of the steering wheels, and permitting the same to travel freely to the right or left along the length of their axles so as to be able to turn about the truck in any direction by a single manipulation.

Figure 1:
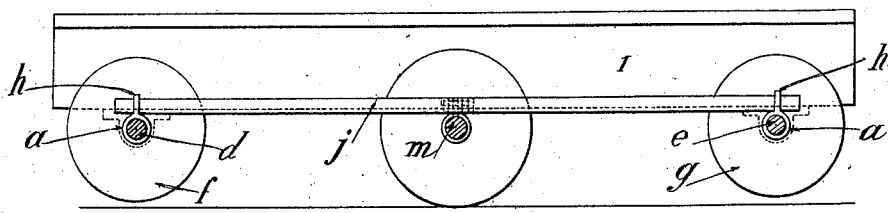
Figure 2:
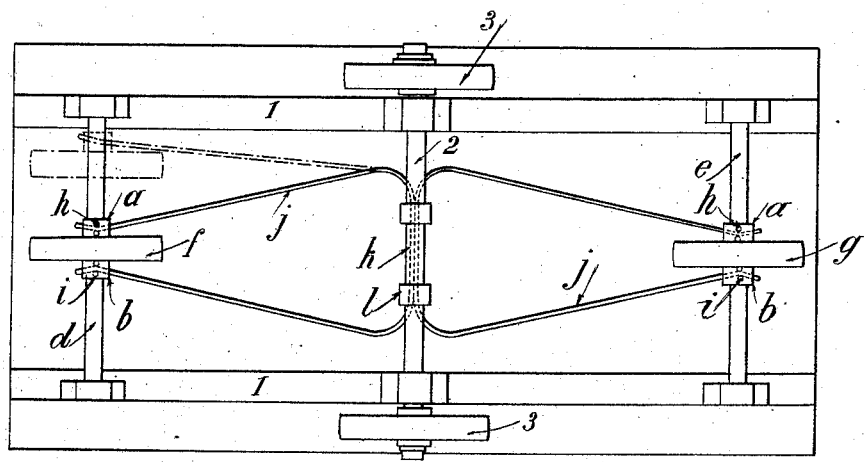
Figure 3:
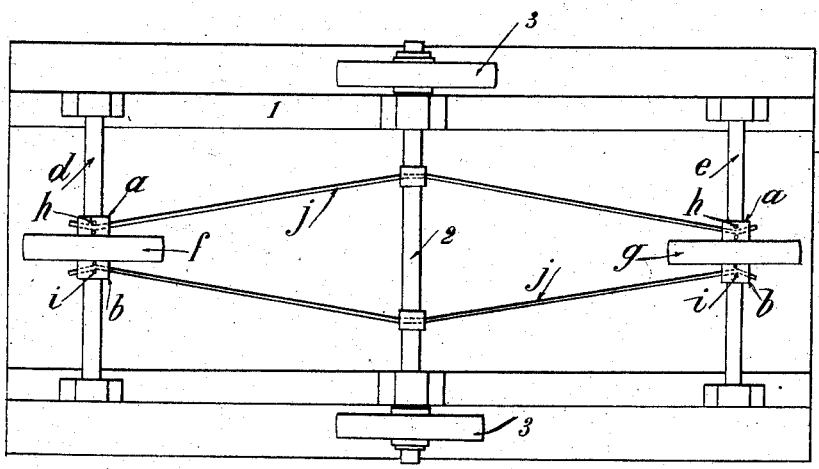

In the annexed drawing, Figure 1 is a longitudinal section, Fig. 2 an inverted plan of a truck, showing the arrangement for returning the sliding wheels to their mid-position, and Fig. 3 is an inverted plan showing a slightly modified form of the truck.
Referring to the drawing, it will be observed that the truck comprises essentially: side bars 1 of wood or metal; a central axle 2 fixed to the chassis or frame; two bearing wheels 3 turning freely on the ends of said axle 2; a front axle $d$ and a rear axle $e$, both fixed to the frame with two steering wheels $f$ and $g$, mounted one on each of said axles $d$ and $e$, so as to be able to turn and slide freely on said axles. These sliding wheels never touch the ground together at the same time. While the truck is in use therefore only three wheels are operative, and the truck acts as a tricycle.

In order to turn the truck, when it is being pushed along, for example, it is sufficient to press on the back so that the rear steering wheel bears on the ground, then to pivot the truck around its bearing wheels; the front steering wheel $f$ for instance pivots around its point of contact with the ground while the axle $d$ slides in the boss of this wheel; when the truck is in the desired direction, the pressure at the back is relieved, and the truck pushed along on the new direction. If the sliding wheel which has just been moved along its axis remained in its new position, clearly it would not be possible to make a fresh turn in the same direction without making the wheel slide laterally on the ground and imparting a considerable effort so as to incur the risk of upsetting the truck; besides, this wheel being no longer in mid-position on its axis, the equilibrium of the truck when it rested on the ground would be defective, and any inequality of load or jerk might upset it. The same observations as have been made regarding the one wheel would equally apply to the other.

Now the invention consists in combining with the members of a truck having sliding steering wheels as above indicated recoil devices for returning immediately to mid-position on its axis the steering wheel which has served as a fixed bearing point during such turning movement, as soon as the turning movement is completed, the said devices being of such a nature as not to impede the wheel in its lateral movements, and to permit the wheel to travel the length of its axle so as to enable tacking movements of any amplitude to be effected in a single operation.

In the construction shown in Figs. 1 and 2, the recoil devices for said sliding wheels are formed as follows: The lateral faces of the hubs of the sliding steering wheels $f$ and $g$ are embraced by sleeves $a$, $b$, likewise sliding on the corresponding axles $d$, $e$, and formed with loops $h$, $i$, receiving the corresponding extremities of a blade spring bent or curved so as to form two longitudinal branches joined by a transverse branch $k$, which is fixed between the prolonged cheeks of collars $l$ surrounding the fixed middle axle 2. The two extremities of the same spring correspond to the same steering wheel, and two like springs are combined to realize in the same conditions the functions of the two opposite steering wheels.

When the truck is turned by bearing on one of the sliding wheels, this wheel remains fixed, the axle $d$ or $e$ sliding in its hub and in the sleeves $a$ and $b$, and the corresponding branch $j$ of the spring is put in tension, taking the position indicated in chain dotted lines in Fig. 2. When the turning movement is terminated, it suffices to give a slight rocking movement to the truck, so that the sliding wheel resting on the ground is lifted, so that immediately the branch $j$ of the spring distending returns this sliding wheel automatically to its normal position, that is to the mid-point of its axle, which immediately gives perfect stability to the truck, and also permits another tacking movement being instantly commenced without any supplementary operation being required. It will be further understood that the spring $j\ k$ being entirely outside the axle $d$ or $e$ on which slides the corresponding steering wheel, the latter may travel all the length of this axle without being impeded by the spring. It is thus possible by a single operation to make evolutions of various degree up to the extent at which the steering wheel abuts against the side cheeks of the frame.

In the modification shown in Fig. 3 the springs $j$ are formed of two separate plates disposed longitudinally and each acting at its ends at the same side on each steering wheel. Each plate $j$ is held fast at the middle of its length in a groove formed in a boss solid with the axle 2.

Having now described my invention, what I claim as new and desire to secure by Letters Patent is:

1. A truck with a central axle fixed to the frame, two bearing wheels turning freely on the ends of said axle, a front and a rear axle fixed both to the frame, two steering wheels mounted respectively on the middle part of each front and rear axle and capable of turning freely and sliding throughout the length of said axles, in combination with elastic means located outside the front and rear axle and adapted to return to the mid-position on its axis the steering wheels, substantially as described and for the purpose set forth.

2. A truck with a central axle fixed to the frame, two bearing wheels turning freely on the ends of said axle, a front and a rear axle fixed both to the frame, two steering wheels mounted respectively on the middle part of each front and rear axle and capable of turning freely and sliding throughout the length of said axles, in combination with two blade springs fixed on the central axle of the carrying wheels, two sliding sleeves placed on the front and on the rear axle at each side of the hub of the steering wheels, and loops mounted respectively on the sliding sleeves and into which are respectively engaged the free ends of the two blade springs, substantially as described and for the purpose set forth.

3. A truck with a central axle fixed to the frame, two bearing wheels turning freely on the ends of said axle, a front and a rear axle fixed both to the frame, two steering wheels mounted respectively on the middle part of each front and rear axle and capable of turning freely and sliding throughout the length of said axles, in combination with two blade springs bent back in the form of a triangle one side of which is fixed on the central axle of the carrying wheels, two sliding sleeves placed on the front and rear axle at each side of the hub of the steering wheels, and loops mounted respectively on the sliding sleeves and into which are respectively engaged the free ends of the two blade springs, substantially as described and for the purpose set forth.

In testimony whereof I have signed my name to this specification in the presence of two subscribing witnesses.

LÉON ERNEST LACHAT.

Witnesses:
   EUGENE BOBIER,
   LOUIS MOSES.